April 5, 1966     H. W. WILSON ET AL     3,244,064
CIRCLE PROJECTOR

Filed Aug. 25, 1958     3 Sheets-Sheet 1

INVENTORS
JERAULD G. WRIGHT
HUGH W. WILSON
BY- Smart & Biggar
ATTORNEYS.

April 5, 1966   H. W. WILSON ET AL   3,244,064
CIRCLE PROJECTOR

Filed Aug. 25, 1958   3 Sheets-Sheet 2

INVENTORS
JERAULD G. WRIGHT
HUGH W. WILSON
BY Smart & Biggar
ATTORNEYS

INVENTORS
JERAULD G. WRIGHT
HUGH W. WILSON
BY— Smart & Biggar
ATTORNEYS.

United States Patent Office 3,244,064
Patented Apr. 5, 1966

3,244,064
CIRCLE PROJECTOR
Hugh William Wilson, Osgoode, Ontario, and Jerauld
George Wright, Ottawa, Ontario, Canada; said Wright
assignor to Her Majesty the Queen in right of Canada,
as represented by the Minister of National Defence
Filed Aug. 25, 1958, Ser. No. 757,154
4 Claims. (Cl. 88—24)

This invention relates to a method and apparatus for presenting the visual solution of a triangle on a presentation screen.

It is an object of the present invention to rapidly indicate on a presentation screen the position of a third apex of a triangle given the two other apices and information regarding a distance of the third apex or relative angular position of the third apex, with respect to the two known apices.

According to the present invention a method of presenting a visual solution of the triangle on a presentation screen comprises the steps of, determining the position of one apex of the triangle to be solved, selecting the position of a projected light beam on the presentation screen to correspond with the position of the said apex, determining the position of a second apex of the triangle to be solved with respect to the first said apex, selecting the position of a second projected light beam on the presentation screen to correspond with the position of the said second apex of the triangle, supplying beam control information as an analogue signal of one of, distance to the third apex, and direction of the third apex, to both light beams whereby to cause the light beams to indicate the position of the third apex of the triangle on the presentation screen.

The invention further provides apparatus for presenting a visual solution of a triangle on a presentation screen comprising means for projecting a pair of light beams onto the presentation screen, means for positioning the projected beams on the screen in positions corresponding to two apices of the triangle to be solved, means for supplying beam control information as an analogue signal of one of, distance to the third apex, and direction of the third apex, to both light beams, whereby to indicate the position of the third apex of the triangle on the presentation screen by beam intersection.

The present invention is particularly concerned with the visual solution of tactical aerial triangulation and to this end the present invention also provides a method of presenting a visual solution on a presentation chart, which method comprises the steps of selecting the position of the center of a projected light beam on the chart to correspond with the ground position of a first object which forms one apex of the triangle to be solved, selecting the position of the center of the second projected light beam on the chart to correspond with the ground position of a second object which forms the second apex of the triangle to be solved, supplying data with respect to the analogue of the respective range from each of the said first and second objects of a third object which forms the third apex of the triangle to be solved to a beam diameter controlling means, controlling the projected diameter of each beam so that the radius thereof corresponds to the respective range of said third object from each of said first and second objects whereby to visually indicate by the intersection of the beams two alternative possible positions on the chart of the said third object.

It is a further feature of the present invention to provide apparatus for presenting the visual solution of a tactical aerial navigational triangle, comprising a pair of light sources mounted adjacent to the chart, each light source being adapted to project a beam of light onto the presentation chart, manually operated means for positioning each light source in one of a plurality of positions in a plane parallel to the chart whereby to select at least one datum point, means adapted to control the diameter of the light beams in response to a signalled analogue of range of a third object with respect to the said datum point, whereby to indicate the position of a third object by the intersection of the light beams.

The following is a description by way of example of one embodiment of the present invention as applied to tactical aerial navigational systems, reference being had to the accompanying drawings in which.

In solving a given triangle an operator knows the positions of two of the apices and his aim is to find the location of the third apex. He positions a pair of light beams on a presentation screen so that the center of the light beams correspond with the positions of two apices. He has available to him information with regard to distances or relative angular position of the unknown third apex from the other apices and this information he feeds to means to control the light beams projected on the presentation screen so that they may be oriented to intersect whereby the position of the third apex of the triangle is indicated.

Figure 1:
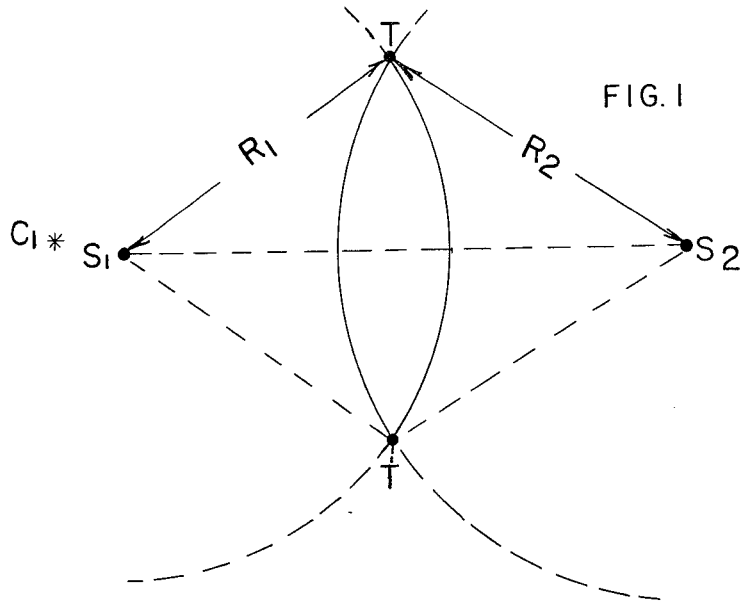
FIGURE 1 is a diagrammatic representation of the solution of a triangle, two possible solutions being shown.
Figure 7:
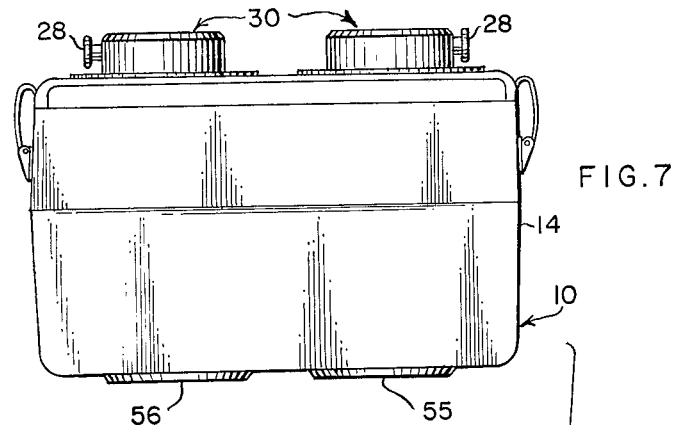
FIGURE 7 is an elevation, not to scale, showing the projector mounted above a chart and a chart table.
Figure 3:
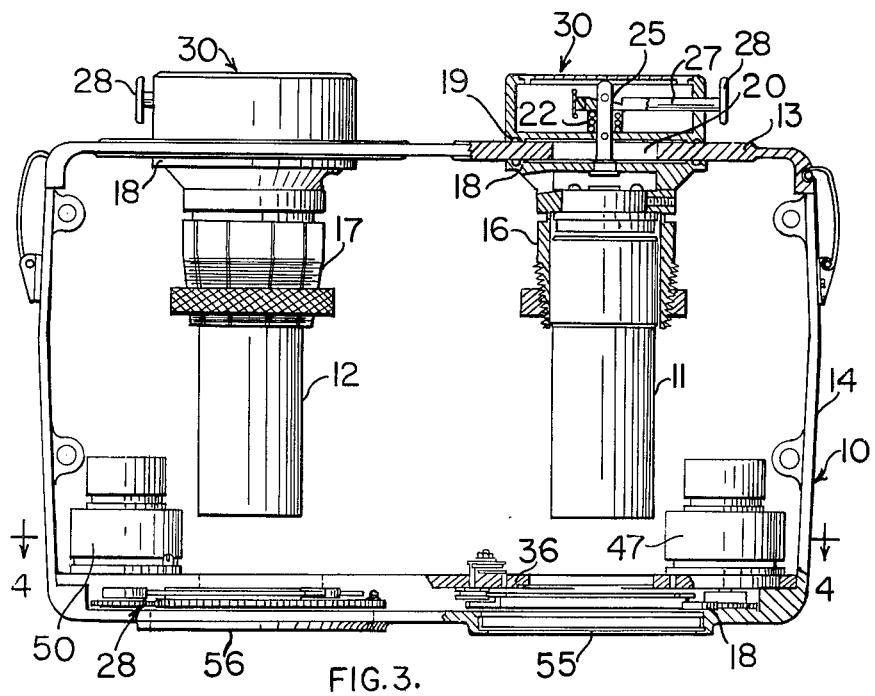
FIGURE 3 is an elevation, partly in section, of the apparatus in accordance with the invention.
Figure 4:
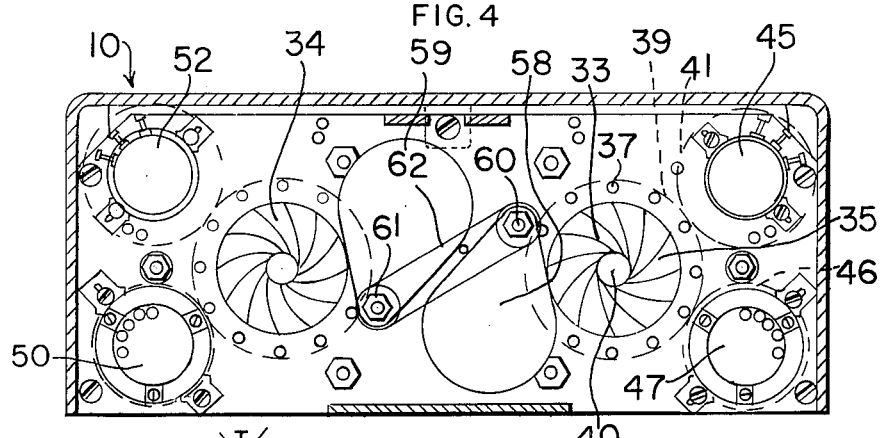
FIGURE 4 is a sectional plan view on the line 4—4 of FIGURE 3.
Figure 2:
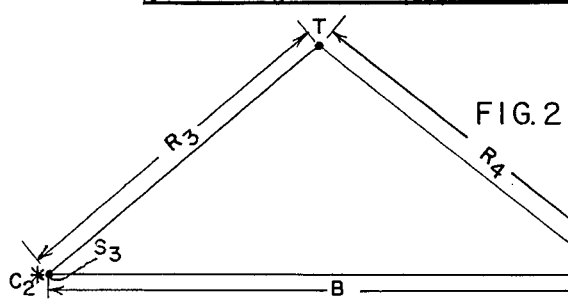
FIGURE 2 is a diagrammatic representation of the triangle of FIGURE 1 in which one of the possible solutions has been rejected.

In the application of the present invention now to be described the triangle to be solved is one presented by the problem of submarine location from an aircraft by echo ranging means. Such a triangle is illustrated in FIGURES 1 and 2, the unknown apex thereof being in FIGURE 1 the target T and the known apices the positions of listening devices $S_1$ and $S_2$. In FIGURE 2 the unknown apex is again the target T and the known apices the position of listening device $S_3$ and sound source $C_3$. FIGURES 3 and 4 show the mechanical apparatus and the lamps which produce the light beams for giving the visual solution of the triangle. FIGURE 7 shows the projector mounted above the chart table on which there is stretched a chart or presentation screen M. The table and chart are shown schematically and the distance between the projector and the chart table is not to scale.

Figure 5:
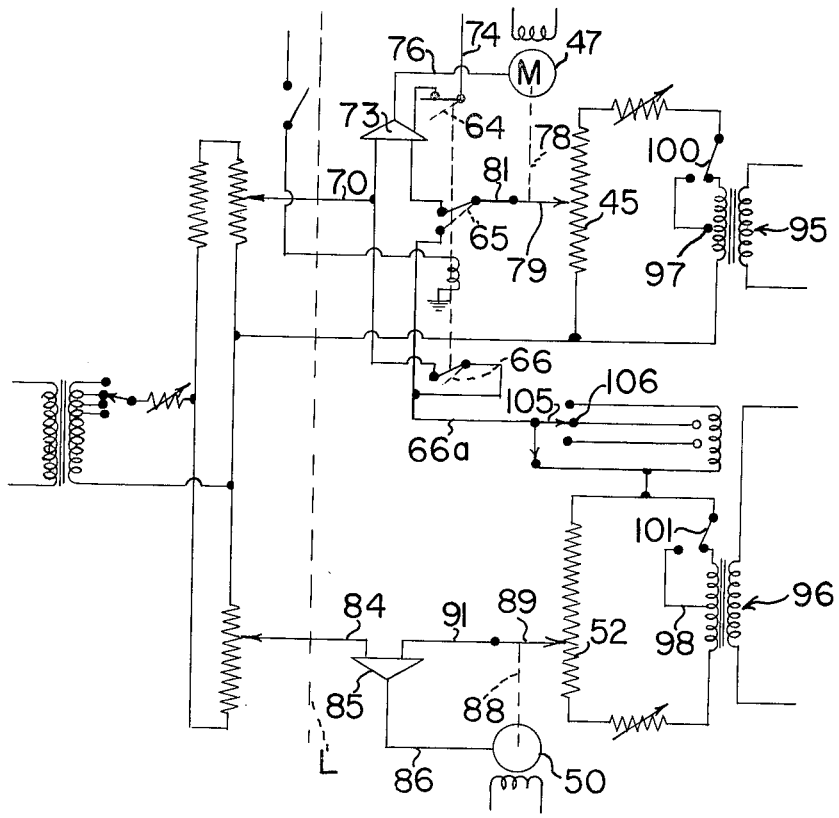
FIGURE 5 is a schematic representation of the electrical circuit of the apparatus of FIGURE 3.

FIGURE 5 shows schematically the electrical diagram of the device.

The apparatus to the left of the vertical dotted line L in FIGURE 5 (hereinafter referred to as the sensing circuit) forms no part of the invention and is a sliding type potentiometer associated with a recorder for the purpose of applying information simultaneously or sequentially to the apparatus in the form of voltages corresponding to the analogue of distance or bearing of one object from another. It will be appreciated that depending upon the problem to be solved the apparatus for applying the information to the circuit to the right of the dotted line L (hereinafter referred to as the solving circuit) may be varied, for example a voltage generator, or generators, could be used.

For the purposes of this description it is not considered necessary to describe the tactical manoeuvres of the aircraft beyond saying that two modes of operation are followed. Mode 1 in which two listening devices $S_1$ and $S_2$ and one sound source (an explosive charge) are used and the information is applied simultaneously to the solving circuit; and mode 2 wherein one listening device $S_3$ (FIGURE 2) and two sound sources are used and the information is applied to the solving circuit separately.

Referring now to FIGURES 1 to 4, a box 10 (FIGURE 3) is mounted at a navigator's station on the aircraft above a chart table (not shown). The box contains a pair of point source lamps 11 and 12 arranged for movement relative to the top wall 13 of the casing 14. The lamps 11 and 12 are mounted in identical holders 16 and 17 provided with flanges 18 and 19. The flanges enclose circular apertures 20 in the top wall 13 of the casing. The flanges are held in positive locked relation to the top wall 13 by a spring 22 which abuts against the top of the flange 19 and biases it into engagement with the top wall 13. A pin 25 centrally located on the flanges passes therethrough and engages the under side of the flange 18. The pin 25 is attached to the top flange 19 and consequently supports the weight of the holder 16. A cam lever 27 provided with a button 28 is adapted on operation to release the spring and to permit the cap 30 of the holder 16 to be moved within the limits of the circular aperture 20. It is possible therefore to move the holders 16 and 17 so that the position of projected light beam on the chart may be selected.

The lamps 11 and 12 are arranged to poject their beams downwardly through a pair of camera irises 33 and 34. Each iris is the same and has the same mechanical elements associated therewith. The leaves 35 of the irises are connected to the bottom plate 36 of the box by pins 37, and are provided with a gear wheel 39 rotation of which moves the leaves 35 to open or close the aperture 40. The gear 39 meshes with a gear 41 attached to the shaft of a potentiometer 45 and with a gear 46 attached to the shaft of a motor 47. The camera iris 34 is provided with a gear similar to the gear 39 which meshes with a gear corresponding with the gear 46 on the motor 50 and a gear corresponding with the gear 41 on the potentiometer 52. As will be seen hereinafter the motor 47 and potentiometer 45, and the motor 50 and potentiometer 52 are electrically connected to provide the required setting of the irises 33 and 34 thereby regulating the diameter of the projecting light beams from the lamps 11 and 12. The iris, motor, and potentiometer and their interpreting elements therefore form a beam diameter controlling means.

Beneath the irises 33 and 34 are a pair of glass windows 55 and 56 through which the beams from the lamps are projected. One of the windows, for example the window 56, may be tinted so that the projected light beam from the lamp 12 is of a slightly different colour from the projected light beam from the lamp 11 thereby enabling the navigator to immediately identify the lamp source of the projected beam on his chart table.

A pair of shutters 58 and 59 are mounted to rotate about points 60, 61 so as to interpose themselves between the light beams and the irises. These shutters are used when the irises are being operated to prevent the navigator from obtaining an erroneous reading during operation of the irises. The shutters are operated by a line 62 driven by a motor (not shown).

MODE 1

In this mode of operation it will be recalled that two listening devices $S_1$ and $S_2$ are used to obtain information with regard to range of the target T by echo ranging means. The sound source is an explosive charge which is dropped close to listening device $S_1$.

The ground positions of listening devices $S_1$ and $S_2$ are set up on the chart by the navigator who positions the beams of light from lamps 11 and 12 so that the center of the beam corresponds with the ground positions of listening devices $S_1$ and $S_2$.

The charge $C_1$ is dropped close to the listening device $S_1$ and in accordance with standard echo ranging practice the sound waves generated by the explosion are picked up by the listening devices $S_1$ and $S_2$ and transmitted to the recorder in the aircraft. The recorder operator in the usual manner interprets the graph of the explosions drawn by the pen of his recorder and he adjusts the potentiometers of the sensing circuit to apply the correct range information to the solving circuit. It will be appreciated that the recorder will show an indication of the explosion first from the listening device $S_1$ since the charge is dropped very close to it and that a second indication of the explosion (the echo wave from the target $T_1$) will show up on the recorder as having travelled a distance approximating to $2R_1$. Similarly, the listening device $S_2$ will get a direct wave generated by the charge $C_1$ and a reflected wave from the target T which wave will have travelled a distance approximately $R_1$ plus $R_2$. For the sake of convenience, it will be observed, the potentiometer of the sensing circuit has been arranged to automatically divide the applied voltage analogous to $R_1$ so that the solving circuit receives a voltage analogous to $R_1$.

Referring now to FIGURE 5, in this mode of operation the solving circuit is arranged with switches 64, 65 and 66 in their closed or full line position. The sound wave information received from the listening devices $S_1$ and $S_2$ is processed at the sensing circuit and is applied as range information to the solving circuit. The motors and potentiometers already described with reference to FIGURES 3 and 4 are indicated by the same numerals in the FIGURE 5.

Beam control information in the form of a voltage analogous to the distance $R_1$ (FIGURE 1) is applied to the line 70 and thereby to a null balancing amplifier 73. The amplifier 73 has a power supply line 74 connected through switch 64. An electrical connection 76 couples the output of the amplifier 73 with a follow-up motor 47. The gear train connection between motor 47 and potentiometer wiper 79 of potentiometer 45 is schematically indicated by the dotted line 78. The wiper 79 applies a second input to the amplifier 73 from the potentiometer 45 through line 81 and switch 65. The position of the wiper 79 is an indication of the size of opening of the aperture 40 of iris 33. The signals received from the electrical connections 70 and 81 are compared in the amplifier 73 and an error signal is produced which is transmitted via line 76 to motor 47 causing the motor 47 to drive the gearing 78 and move the wiper 79 of the potentiometer 45 to a point of balance so that the voltages in electrical connections 70 and 81 are nullified. Thus the aperture 40 of the iris 33 is caused to take up a position whereby the radius of the projected beam of light from the lamp 11 corresponds with range $R_1$. At the same time a voltage analogous to distance $R_1+R_2$ (FIGURE 1) is applied to line 84 and thence to a second null balancing amplifier 85, the output on line 86 of the amplifier 85 is applied to the follow-up motor 50, the gear train connecting motor 50 and the wiper 89 of the potentiometer 52 is schematically indicated at 88. The potentiometer 52 acts as a follow-up potentiometer in a manner similar to the potentiometer 45 so that the voltage applied at take-off line 91 and conducted as an input to amplifier 85 is compared with the voltage on line 84 forming the first input to the amplifier 85. It will be noted that the voltage on line 91, because of the cross-connection of line 66a to a source of voltage representative of $R_1$, is analogous the distance to $R_2$. The error signal thus produced in the amplifier is utilized as before to cause movement of the iris 34 to control the projected beam diameter from the lamp 12 so that the radius of the beam corresponds with range $R_2$.

When the settings of irises 33 and 34 have been completed shutters 58, 59 are opened and the navigator obtains on his presentation chart an intersection of his two, projected beams. The points of intersections are plotted and thus the navigator is provided with two alternative ground positions of the target T.

Transformers 95 and 96 are arranged in series in the solving circuit, the transformers having center taps 97 and 98. Switches 100 and 101 connect the potentiometers 45 and 52 to all of the windings of the transformers or to taps 97 and 98. The object of the transformers 95 and 96 is to permit the irises 33 and 34 to be operated on different scales. With a variable tapping on the transformers it is possible to have a large range of scales of operation.

After plotting the two alternative positions of the target T the shutters 58 and 59 are closed.

MODE II OPERATION

In this mode of operation one listening device $S_3$ (FIGURE 2) and two sound sources (explosive charges) $C_2$ and $C_3$ are used. The position of listening device $S_3$ forms one apex of the triangle to be solved, the position of the second charge $C_3$ forms the second apex and the third apex is again the position of the target T.

Two sequences of recordings are made, the first of which is for charge $C_2$ which is dropped close to listening device $S_3$. During the recording of the first explosion the circuit is as for mode 1 and iris 33 is set to correspond to range $R_3$. Then three "memory" switches 64, 65, 66 are transferred to the position indicated by the dotted line.

Thus as amplifier 73 is switched out of the circuit the position of potentiometer wiper 79 which corresponds to range $R_3$ is held. The voltage on this wiper is now used in place of the normal input of line 70 since switch 66 is open and switch 65 is closed.

The second recording of the sequence is now made using charge $C_3$ dropped at a known distance B from $S_3$.

The navigator positions the centre of the projected beam from lamp 12 to correspond with the plotted ground position of listening devices $S_3$, and the centre of the projected beam from lamp 11 to correspond with the plotted ground position of $C_3$. Range data with regard to the distance of the target from charge $C_3$ and the listening device $S_3$ is then obtained from the sensing circuit and fed into amplifier 85 through line 84. This information is a voltage analogous to the distance $R_3+R_4-B$, since the shock wave from the explosion of charge $C_3$ travels not only the distance $R_4$ and the reflected wave from the target T the distance $R_3$ to the listening device $S_3$ but also along the direct path B to the listening device $S_3$, the recorder running all the time. Owing to the fact that this information contains the factor of the distance B, it is necessary that the potentiometer 52 have a corresponding voltage set therein. To this end, the navigator sets into the solving circuit a correction voltage corresponding to a distance B by moving the switch 105 to select a contact 106. Again because of the cross-connection 66a and switch 65, line 91 feeds into the amplifier 85 the correction factor of B and $R_3$. The motor 50 then follows the signal from the amplifier 85 and thus opens iris 34 a distance corresponding with range $R_4$. The shutters 58 and 59 are then opened and the intersection of the beams plotted.

Figure 6:
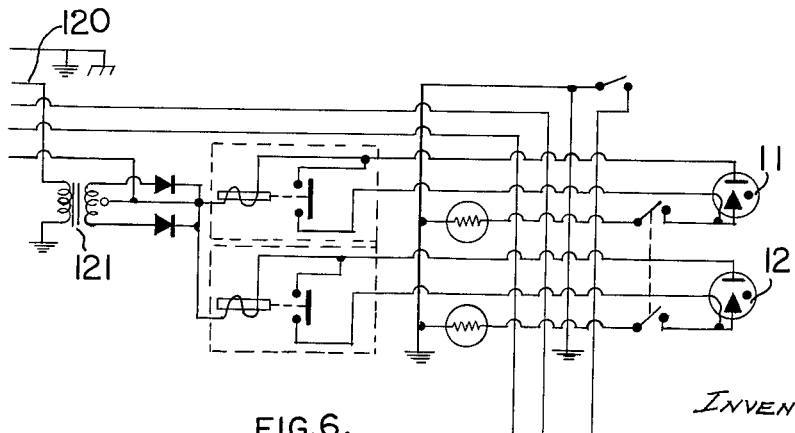
FIGURE 6 is a simplified circuit diagram of two point light source lamps and the starting circuit therefor.

Referring now to FIGURE 6, which illustrates a starting circuit for the lamps 11 and 12, it will be noted that this is a standard starting circuit. The starting signal is applied to the primary of transformer 121 via line 120 and the lamps 11 and 12 are fired.

Associated with the cam 27 on both lamp holders is a micro switch which is adapted to shut the corresponding iris to its minimum opening when the button 28 is depressed to permit movement of lamp and holder. Thus the navigator in positioning the projected light beam is provided with a beam of minimum diameter to facilitate accurate positioning of the beams.

It will be appreciated that the present invention is applicable to the solution of triangles where information with regard to angular bearing of the third apex of the triangle is known from the other two apices. The only major modification of the apparatus described would be the replacement of the irises 33 and 34 by rotatable slots. Information with regard to target bearing would then be applied to lines 70 and 84 of the solving circuit instead of information regarding range of target. Instead of altering the iris setting the information would be used to align the slits in azimuth.

What is claimed is:

1. Apparatus for presenting the visual solution of an aerial triangulation problem, given the position of two apices of the triangle, by showing directly on a chart the position of the third and unknown apex of the triangle to be solved on a chart, comprising a pair of light sources mounted adjacent to a chart, means to cause each light source to project a circular image onto the chart, manually operated means for positioning each light source in a plane parallel to the chart whereby to position the centre point of each projected circular image to correspond with the ground position of the two known apices on the chart, diameter control means to control the diameters of the projected images, means for providing an analogue signal of the range of the unknown apex from each of the given apices to actuate said diameter control means, whereby to indicate the position of a third apex, and its mirror image, by the intersection of the circular images.

2. Apparatus for presenting the visual solution of an aerial triangulation problem, given the ground positions of first and second objects, which positions form two apices of the triangle to be solved, comprising a projector located above a chart, a pair of point light source lamps mounted in the projector means to cause each light source to project a circular image onto the chart, manually operated means for moving the lamps within the projector in a plane parallel to the chart whereby to position the center of the projected circular images on the chart to correspond with the ground positions of said first and second objects, diameter control means in said projector operable to control the diameters of the projected circular images, means for providing analogue signals of the ranges of a third object, forming the third and unknown apex of the triangle to be solved, from said first and second objects to actuate said diameter control means whereby to indicate the position of the third object by the intersection of the circular images.

3. Apparatus as claimed in claim 2 in which each lamp is mounted in a holder within said projector and said manually operated means for positioning the lamps comprises a pair of flanges on said holder adapted to lockingly engage the inside and outside surfaces of a top wall of said projector about one of a pair of circular holes therein; a stem member connecting said flanges and passing through said circular hole, spring means for biasing said flnages into locking engagement with said top wall, and latch means operable to release the tension on said spring means whereby to permit the holder and lamp to be moved relative to said top wall.

4. Apparatus for presenting the visual solution of an aerial triangulation problem comprising a projector located above a projection screen, a pair of point light source lamps mounted in the projector to project a pair of circular images onto the screen, manually operated means for moving the lamps within the projector in a plane parallel to the screen whereby to selectively position the center of the projected circular image on the screen, a pair of camera irises mounted on said projector one beneath each lamp, an analogue signal of a desired iris opening position from an external source, and an analogue signal of instantaneous iris setting from a sensing potentiometer and for generating a command error signal to operate the motor to drive its associated iris to take up the desired opening position.

References Cited by the Examiner

UNITED STATES PATENTS

| 735,497 | 8/1903 | Griffith | 33—46 |
|---|---|---|---|
| 2,427,220 | 9/1947 | Luck | 343—15 X |
| 2,633,570 | 3/1953 | Greenwood | 343—15 |
| 2,637,848 | 5/1953 | Cunningham | 88—24 X |
| 2,678,583 | 5/1954 | Knapik | 95—64 |
| 2,921,511 | 1/1960 | Vinten | 95—64 |
| 2,930,668 | 3/1960 | Behrmann et al. | 346—8 |
| 3,016,791 | 1/1962 | Inwagen | 88—24 X |

NORTON ANSHER, *Primary Examiner.*

A. M. HORTON, S. FEINBERG, BENJAMIN A. BORCHELT, *Examiners.*

W. J. CURRAN, P. J. BETHERS, W. J. NELSON, V. R. PENDERGRASS, VANCE A. SMITH,
*Assistant Examiners.*